United States Patent Office 2,839,375
Patented June 17, 1958

2,839,375
NITROGEN-PHOSPHORUS COMPOSITION

Curtis G. Christian, Anaheim, Calif., assignor, by mesne assignments, to Collier Carbon and Chemical Corporation, a corporation of California No Drawing. Application January 27, 1955
Serial No. 484,567

8 Claims. (Cl. 71—32)

This invention relates to a new composition of matter and to a method of making the same, and in particular concerns a new chemical compound of unknown molecular structure containing the elements nitrogen and phosphorus.

A number of attempts have been made to prepare plant nutrient compositions containing a high proportion of nitrogen and phosphorus by reacting phosphorus or phosphorus pentoxide with ammonia or mixtures of ammonia and oxygen. Prior to the present invention, however, the compositions so prepared were either hygroscopic, semi-pyrophoric or noxious-smelling materials which were very unsatisfactory for use as fertilizers.

I have now found that a stable non-hygroscopic and odorless product containing an exceptionally high proportion of nitrogen and phosphorus may be prepared by a reaction between phosphorus, ammonia and oxygen carried out as hereinafter described. The product so prepared is well adapted to use as a fertilizer and may also be employed as an intermediate in the preparation of new phosphorus- and nitrogen-containing compounds. It takes the form of a gray, finely-divided amorphous solid which melts at 295°–298° C. It is highly soluble in water to form clear solutions having a pH value of about 8. Its ultimate analysis varies somewhat depending upon the reaction temperature employed in its preparation, but such analysis is characteristically as follows:

| | Percent by wt. |
|---|---|
| Total nitrogen | 28–30 |
| Total phosphorus | 28–30 |
| Total hydrogen | 6–6.5 |
| Oxygen (by difference) | 35–40 |

The nitrogen and phosphorus analyses indicate the product to contain approximately 2 atoms of nitrogen per atom of phosphorus. Its X-ray diffraction pattern, infrared spectrum and other analytical properties indicate this new product to be polymeric in nature, but its molecular structure is not known with certainty; accordingly, it is herein described and claimed by means of its prearation rather than as a distinct chemical compound.

The new product is prepared by a two-stage process, the first of which involves reacting elemental phosphorus with ammonia and oxygen at a relatively low temperature after which the reaction product so formed is heat-treated at a moderately elevated temperature for a short period of time. The second stage of the process consists in reacting the heat-treated product of the first stage with anhydrous ammonia at an elevated temperature and under superatmospheric pressure.

Conveniently, the first stage of the process is carried out by heating yellow elemental phosphorus to a temperature somewhat above its melting point, e. g., to 50°–140° C., and passing a gas mixture comprising ammonia and oxygen over the surface of the molten phosphorus while maintaining the environmental temperature below about 150° C., preferably between about 90°–140° C. The oxygen content of the gas mixture should not exceed about 5 volume percent and is preferably held to between about 0.1 and about 2 volume percent. The ammonia content should be at least about 5 volume percent and may be as high as 99.9 volume percent. However, control of the reaction temperature is facilitated if the ammonia content of the mixture is held below about 50 volume percent and the remainder consists of an inert gas such as nitrogen, argon, etc. A particularly useful gas mixture consists of about 10–15 percent of ammonia, about 1–2 volume percent of oxygen and about 83–89 volume percent of nitrogen. It is essential that the reaction temperature be maintained below about 150° C., and suitable control thereof may conveniently be attached by controlling the temperature and/or the composition of the gas mixture. According to a preferred mode of operation the body of molten phosphorus is maintained at about 130° C. and the temperature of the gas mixture at its point of entry into the reaction vessel is maintained at about 95° C. Since the reaction is preferably effected by reacting the reactants at the surface of a body of molten or solid phosphorus, the latter most efficiently should take the form of a thin film or layer so that maximum surface is exposed to the gas mixture.

The reaction between the phosphorus, ammonia and oxygen at a reaction temperature below about 150° C. is accompanied by a copious evolution of white fumes. This material is passed directly to a heating zone or oven wherein it is subjected to a temperature above about 300° C., preferably between about 425° and about 600° C. for a period of time between about 0.05 and about 5 seconds, preferably between about 0.2 and about 1 second. The heat-treated product, which constitutes an intermediate product of the process, is then withdrawn from the heating zone and collected by electrostatic precipitation, a bag-filter or a spray-washing system such as are used in collecting carbon black. This product takes the form of a fluffy white amorphous solid of unknown structure, which melts with decomposition at 290°–315° C. It is soluble only to a very limited extent in water and common organic solvents but is slowly hydrolyzed by aqueous alkalis and acids. Characteristically it contains about 21 percent total nitrogen, about 31.8 percent total phosphorus, about 3.7 percent total hydrogen, and (by difference) about 43.5 percent oxygen.

The second stage of the present process is conveniently carried out batch-wise simply by charging the product of the first stage and anhydrous liquid ammonia into an autoclave or other pressure vessel and heating the mixture to a reaction temperature above about 50° C., preferably between about 100° C. and about 300° C., and under autogenic pressure. During the reaction the autogenc pressure within the reaction vessel rises to a maximum value which is usually between about 120 and about 500 p. s. i. g., depending upon the reaction temperature and ratio in which the reactants are employed. Usually the reaction is completed in from about 1 to about 20 hours, depending upon the reaction temperature employed. The ammonia reactant is preferably provided in relatively large excess, e. g., 5–10 pounds of anhydrous ammonia are usually employed per pound of the first-stage reaction product.

Upon completion of the second-stage reaction, the reaction vessel and contents are cooled to atmospheric temperature and any excess ammonia is vented from the vessel and recovered for re-use. The reaction product, which constitutes the new nitrogen-phosphorus composition of the invention, is recovered from the vessel as a gray solid which differs markedly from the first-stage reaction product in that it is completely soluble in water. If desired, it may be purified by fractional crystallization.

As will be apparent to those skilled in the art, various engineering and manipulative techniques may be applied in preparing the new product. Both stages of the process by which it is prepared may be carried out batchwise, semi-continuously or continuously, and various methods of achieving the proper temperatures and control of the same may be employed. In essence the invention consists in the process of reacting elemental phosphorus with oxygen and ammonia at a reaction temperature below about 150° C., followed by heating the product so formed to a temperature above about 300° C. and thereafter reacting the heat-treated product with anhydrous ammonia at a temperature above about 50° C. under superatmospheric pressure. It also consists in the novel product obtained by such process.

The following example will illustrate one way in which the principle of the invention has been applied but is not to be construed as limiting the same:

*Example*

A gas mixture consisting of 11.6 volume percent of ammonia, 1.4 volume percent of oxygen, and 87.0 volume percent of nitrogen was heated to a temperature of about 95° C. and passed through a tubular reaction chamber which comprised, in succession, a horizontal reaction zone which was maintained at a temperature of about 130° C., a horizontal heat-treating zone which was maintained at a temperature of about 425° C. and a vertical product-collection zone containing an electrostatic precipitator. A body of molten yellow phosphorus was maintained in the reaction zone. As the gas mixture swept across the surface of the body of phosphorus, copious white fumes were evolved and were carried by the gas stream through the heat-treating zone and across the electrostatic precipitator. The rate of gas flow was such that the white fumes had a residence time within the heat-treating zone of about 0.5 second. The product which was precipitated from the gas stream as it passed through the product-collection zone was a very finely-divided fluffy white powder having the analysis and properties previously given for the first stage reaction product.

Approximately 1 part by weight of the product obtained above and 8 parts by weight of liquid ammonia were charged to a pressure vessel and therein heated at a temperature of about 110° C. for about 18 hours. During the heating the maximum pressure developed within the vessel was about 410 p. s. i. g. At the end of the heating period the vessel and contents were cooled to room temperature, the ammonia was vented from the vessel, and the product was withdrawn as a gray powder which was completely soluble in water. It contained about 28 percent nitrogen and about 28 percent of phosphorus, corresponding to the fertilizer designation "28:64:0."

In employing the new product as a fertilizer or plant nutrient it may conveniently be applied to the soil and/or plants in the form of an aqueous solution. Since the product is exceptionally rich in nitrogen and phosphorus (containing plant nutrient elements to an extent of better than 90 percent) it is effective in relatively small quantities, and aqueous solutions of the same having excellent plant nutrient value may be relatively dilute, e. g., they may contain as little as 0.1–5 percent of the active ingredient. The new product may also be employed in solid form as by direct application to the surface of the soil or admixture therewith by harrowing or the like.

Other modes of applying the principles of my invention may be employed instead of those explained, change being made as regards the materials or methods employed provided the steps or product stated by any of the following claims, or the equivalent of such stated steps or product, be employed or obtained.

I, therefore, particularly point out and distinctly claim as my invention:

1. The process which comprises (1) contacting elemental phosphorus with a gas mixture comprising between about 0.1 and about 5 volume percent of oxygen and at least about 5 volume percent of ammonia at a reaction temperature below about 150° C., (2) subjecting the reaction product so obtained to a temperature above about 300° C. for a period of time between about 0.05 and about 5 seconds, and (3) heating the product of step (2) with anhydrous ammonia at a reaction temperature above about 50° C. and under autogenic pressure for a period of time sufficient to effect the formation of a water-soluble amorphous solid having a total nitrogen content of about 28–30 percent by weight and a total phosphorus content of about 28–30 percent by weight.

2. The process of claim 1 wherein, in step (1), the gas mixture consists of between about 0.1 and about 5 volume percent of oxygen, between 5 and about 50 volume percent of ammonia, and the remainder is a gas which is non-reactive at the said reaction temperatures.

3. The process of claim 1 wherein, in step (1), the gas mixture consists of between about 1 and about 2 volume percent of oxygen, between about 5 and about 15 volume percent of ammonia, and between about 83 and about 89 volume percent of nitrogen.

4. The process of claim 1 wherein, in step (1), the said reaction temperature is between about 90° C. and about 140° C.

5. The process of claim 1 wherein, in step (2), the temperature is between about 425° C. and about 600° C. and the time of heating is between about 0.2 and about 1 second.

6. The process of claim 1 wherein, in step (3), the temperature is between about 100° C. and about 300° C.

7. The process of claim 1 wherein, in step (3), between about 5 and about 10 parts by weight of anhydrous ammonia are employed per part by weight of the product formed in step (2).

8. The process which comprises (1) passing a gas mixture comprising between about 0.1 and about 5 volume percent of oxygen and at least about 5 volume percent of ammonia over the surface of a body of molten yellow phosphorus while maintaining an environmental temperature between about 90° C. and about 140° C. whereby white fumes are evolved from said surface, (2) carrying said fumes through a heating zone where they are subjected to a temperature between about 425° C. and about 600° C. for a period of time between about 0.05 and about 5 seconds and collecting the product so formed, and (3) heating the product formed in step (2) with between about 5 and about 8 parts by weight of anhydrous ammonia at a temperature between about 100° C. and about 300° C. and under autogenic pressure for from about 1 to about 20 hours whereby there is obtained a water-soluble amorphorus solid having a total nitrogen content of about 28–30 percent by weight and a total phosphorus content of about 28–30 percent by weight.

References Cited in the file of this patent

UNITED STATES PATENTS

| | | |
|---|---|---|
| 2,122,122 | Woodstock | June 28, 1938 |
| 2,561,415 | Rice | July 24, 1951 |
| 2,689,780 | Rice | Sept. 21, 1954 |
| 2,713,536 | Driskell | July 19, 1955 |
| 2,717,198 | Jones et al. | Sept. 6, 1955 |